United States Patent [19]
Guswiler

[11] Patent Number: 5,624,151
[45] Date of Patent: Apr. 29, 1997

[54] HEADLINER RETAINER

[76] Inventor: Gerald W. Guswiler, 1785 Perry Rd., Green Cove Springs, Fla. 32043

[21] Appl. No.: 528,562

[22] Filed: Sep. 15, 1995

[51] Int. Cl.$^6$ ................................... B60R 13/02
[52] U.S. Cl. ........................... 296/214; 52/506.05
[58] Field of Search ..................... 296/39.1, 214; 224/311, 313; 52/506.05

[56] References Cited

U.S. PATENT DOCUMENTS

| | | | |
|---|---|---|---|
| 2,253,423 | 8/1941 | Fellers et al. | 224/311 |
| 2,336,274 | 12/1943 | Mazet | 224/313 X |
| 2,673,705 | 3/1954 | Buckley | 224/311 X |
| 4,441,641 | 4/1984 | Thompson | 224/311 |
| 4,971,388 | 11/1990 | Knaggs | 296/214 |
| 5,285,941 | 2/1994 | Herrera | 224/311 X |

FOREIGN PATENT DOCUMENTS

| 1241184 | 8/1960 | France | 224/311 |
|---|---|---|---|

Primary Examiner—Dennis H. Pedder

[57] ABSTRACT

A headliner retainer consists of two elongate members which are selectively attachable together and which can be springedly and flexibly retained against a vehicle's headliner, especially in those situations where the headliner is breaking loose and beginning to sag. One of the two members is provided with a plurality of aligned apertures, and the second member has a plurality of outwardly extending projections which are engagable with the apertures. This arrangement facilitates an initial adjustment of length so that the headliner retainer can be flexibly snapped into place against the sagging headliner. Each of the outwardly extending projections are rotatably mounted on an axis which is eccentrically displaced with respect to each projection. The ends of the projections are provided with screwdriver-receiving slots so that they can be rotated once they have been directed through the apertures in the first member. This facilitates a tightening displacement due to the relative movement between the first and second members so as fixedly secure the headliner retainer in a final abutting relationship to the sagging headliner.

2 Claims, 3 Drawing Sheets

HEADLINER RETAINER

BACKGROUND OF THE INVENTION

1. Field of the Invention

The present invention relates to vehicle headliners and more particularly pertains to a headliner retainer for holding a sagging headliner in place against the interior surface of a vehicle's passenger compartment roof.

DESCRIPTION OF THE PRIOR ART

The use of headliner retainers is known in the prior art. This is evidenced by the granting of a number of patents relating to various functional and structural aspects of headliner retainers. An example of a known pertinent patent is include U.S. Pat. No. 4,971,388 which issued to Knaggs on Nov. 20, 1990 and which is directed to the construction of a headliner support. As best illustrated in FIG. 7 of this patent, the support is constructed as a resiliently flexible strip which can be bent into position so as to retain a sagging headliner against a vehicle's passenger compartment roof. The ends of the support, as shown in FIG. 7, are designed to engage existing lip structures, or the like, which may already exist within a passenger compartment. In effect, this patent illustrates the use of a resiliently flexible strip which is cuttable to a length longer than the horizontal length but not longer than the peripheral length of the cross-body contour of the passenger compartment, whereby it may be flexibly bent and retained in position against the headliner. While being operable for its intended purpose, it can be appreciated that even a slight mismeasurement of the length could result in an inaccurate and improper fit of the support against the headliner.

As such, there apparently still exists the need for a resiliently flexible strip which can be snap-fitted into position against a headliner inside the passenger compartment of a vehicle and wherein additional adjustment means are then selectively useable to provide finite tightening and lengthwise adjusting of the strip once is has been positioned against the headliner. In this respect, the present invention substantially fulfills this need.

SUMMARY OF THE INVENTION

In view of the foregoing disadvantages inherent in the known types of headliner retainers now present in the prior art, the present invention provides a new headliner retainer wherein the same can be utilized to support a sagging vehicle compartment headliner against the interior roof structure of a passenger compartment. As such, the general purpose of the present invention, which will be described subsequently in greater detail, is to provide a new and improved headliner support structure and method which has many of the advantages of the headliner retainer mentioned heretofore and many additional novel features that result in a headliner retainer which is not anticipated, rendered obvious, suggested, or even implied by any of the prior art headliner retainers, either alone or in any combination thereof.

To attain this, the present invention generally comprises a headliner retainer which consists of two elongate members that are selectively attachable together and which can be springedly and flexibly retained against a vehicle's headliner, especially in those situations where the headliner is breaking loose and beginning to sag. One of the two members is provided with a plurality of aligned apertures, and the second member has a plurality of outwardly extending projections which are engagable with the apertures. This arrangement facilitates an initial adjustment of length so that the headliner retainer can be flexibly snapped into place against the sagging headliner. Each of the outwardly extending projections are rotatably mounted on an axis which is eccentrically displaced with respect to each projection. The ends of the projections are provided with screwdriver-receiving slots so that they can be rotated once they have been directed through the apertures in the first member. This facilitates a tightening displacement due to the relative movement between the first and second members so as fixedly secure the headliner retainer in a final abutting relationship to the sagging headliner.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new headliner retainer and method which has many of the advantages of the headliner retainers mentioned heretofore and many novel features that result in a headliner retainer which is not anticipated, rendered obvious, suggested, or even implied by any of the prior art headliner retainers, either alone or in any combination thereof.

It is another object of the present invention to provide a new headliner retainer which may be easily and efficiently manufactured and marketed.

It is a further object of the present invention to provide a new headliner retainer which is of a durable and reliable construction.

An even further object of the present invention is to provide a new headliner retainer which is susceptible of a low cost of manufacture with regard to both materials and labor, and which accordingly is then susceptible of low prices of sale to the consuming public, thereby making such headliner retainer economically available to the buying public.

Still yet another object of the present invention is to provide a new headliner retainer which provides in the apparatuses and methods of the prior art some of the advantages thereof, while simultaneously overcoming some of the disadvantages normally associated therewith.

Still another object of the present invention is to provide a new and improved headliner retainer which can be utilized to retain a sagging headliner within a vehicle passenger compartment.

Yet another object of the present invention is to provide a new and improved headliner retainer which can be finitely length-wise adjusted after being placed in a supporting position against a sagging passenger compartment headliner within a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a perspective view of an outwardly extending projection forming a part of the present invention.

DESCRIPTION OF PREFERRED EMBODIMENTS

Figure 1:
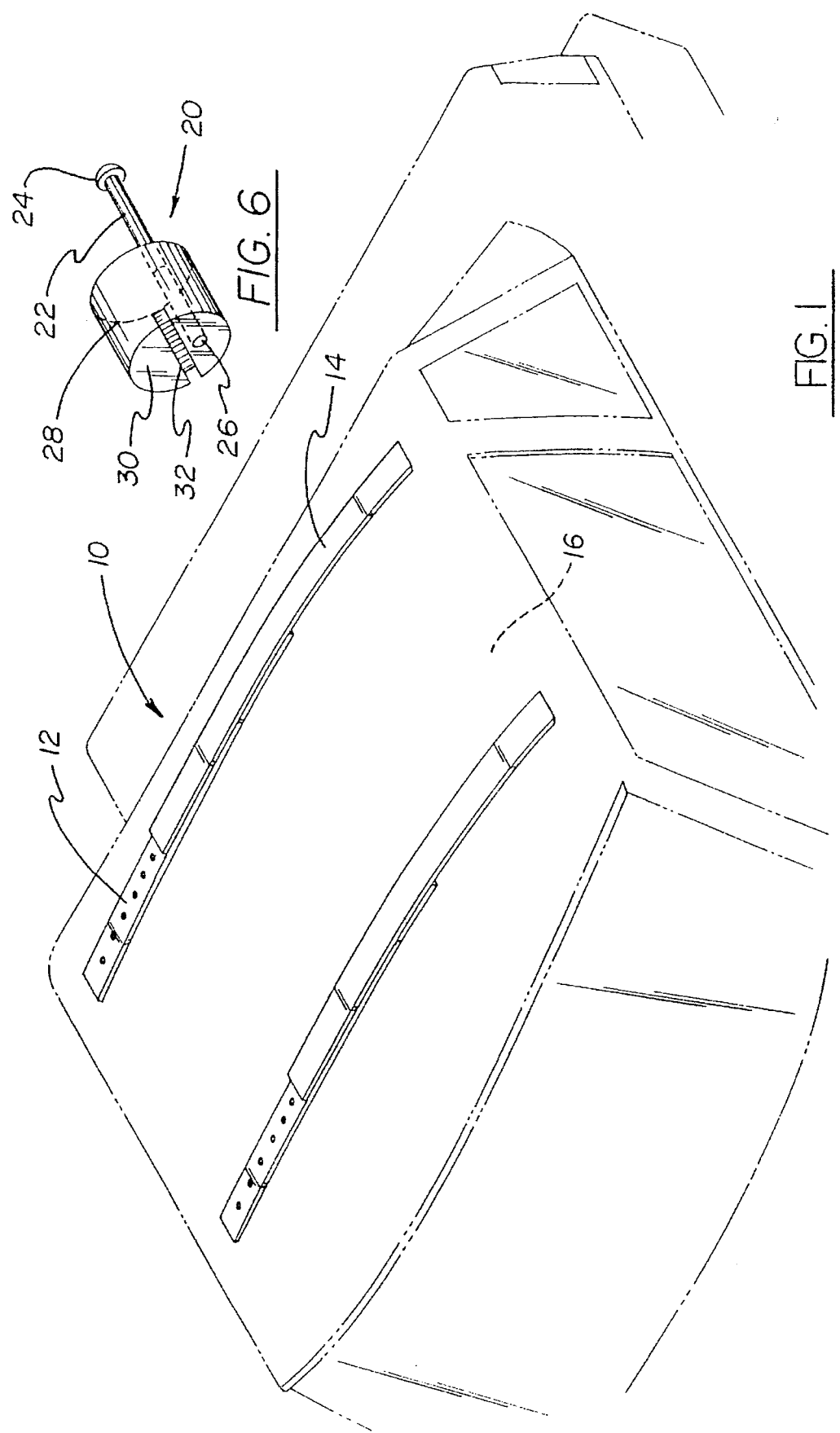
FIG. 1 is a perspective view of a pair of the headliner retainers comprising the present invention showing the same in an operable position against the interior roof of a vehicle's passenger compartment.
Figure 2:
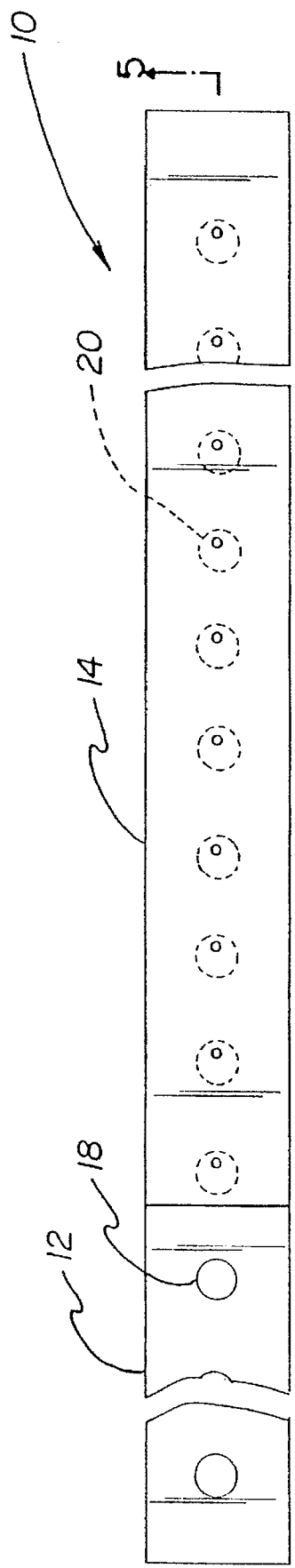
FIG. 2 is a top plan view of the invention.

With reference now to the drawings, and in particular to FIGS. 1-6 thereof, a new headliner retainer embodying the principles and concepts of the present invention and generally designated by the reference numeral 10 will be described.

More specifically, it will be noted that the headliner support 10 essentially consists of a first support member 12 which is selectively and adjustably attachable to a second support member 14. The first and second support members 12, 14 are each made of a resilient, flexible material, such as plastic or the like, and are designed to be snap-fitted against an interior roof section of a vehicle's passenger compartment 16 so as to retain a sagging headliner against the roof's interior surface.

The resiliently flexible first member 12 is provided with an aligned array of through-extending apertures 18. These apertures 18 are closely spaced together and are designed to facilitate an attachment of the second flexible member 14 in a manner which will be subsequently described. The apertures 18 are strategically spaced so as to provide a maximum degree of length-wise adjustment between the members 12, 14, thereby to achieve a proper overall length for the headliner retainer 10 when it is fixedly and resiliently secured against a sagging headliner.

Figure 4:
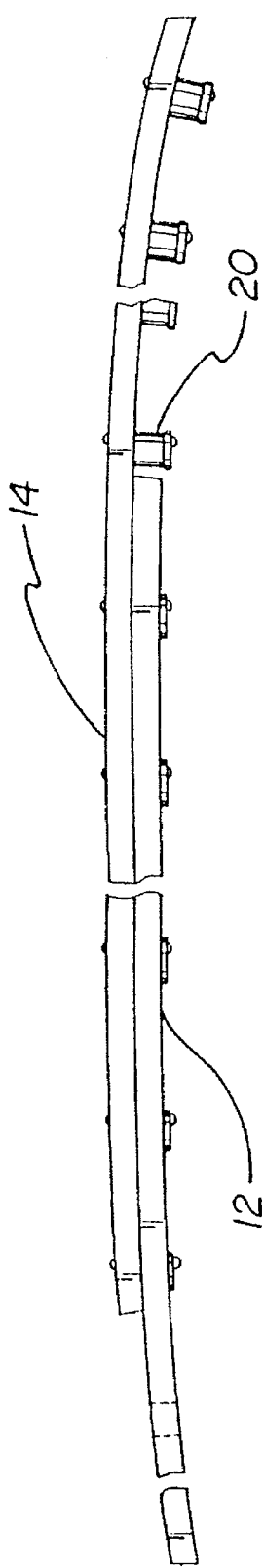
FIG. 4 is a side elevation view of the invention.
Figure 5:
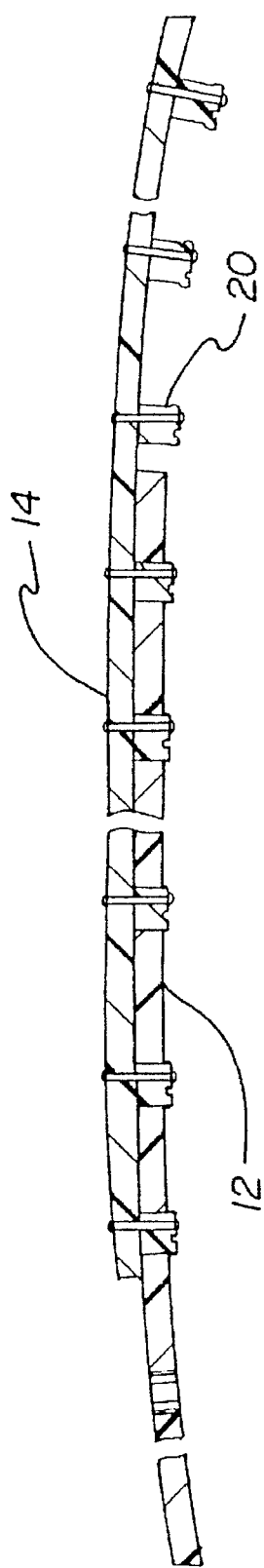
FIG. 5 is a cross-sectional view of the invention as viewed along the line 5—5 in FIG. 2.

With continuing reference to the drawings, it can be seen that the resiliently flexible second member 14 is provided with a plurality of aligned and outwardly extending projections 20. These projections 20 are spaced apart at a distance equal to the spacing of the apertures 18 on the first flexible member 12. During an adjustment of the length of the headliner retainer 10, the projections 20 are designed to be aligned with the closest apertures 18 which facilitate the choosing of a proper overall length, and they may then be forcibly positioned through the aligned apertures as best illustrated in FIGS. 4 and 5. This allows an initial length-wise adjusting of the headliner retainer 10 so that it can be fixedly secured in position against a sagging headliner.

As to the manner of attaching an assembled headliner retainer 10, reference is made to U.S. Pat. No. 4,971,388 which issued to Knaggs patent on Nov. 20, 1990 and which was discussed priorly with respect to known prior art patents. The Knaggs patent discloses one means of retaining a headliner support member in position against a sagging headliner once it has been resiliently positioned thereagainst. The disclosure of the Knaggs is incorporated herein by reference, and it is to understood that virtually any type of attachment means could be utilized at the remote ends of the headliner retainer 10 which would facilitate its permanent securement within the vehicle's passenger compartment, to include the use of adhesives, various types of fasteners or even a structure similar to that illustrated in the Knaggs patent. Such attachment means form no part of the present invention since they are generally known and available in the public domain.

Figure 3:
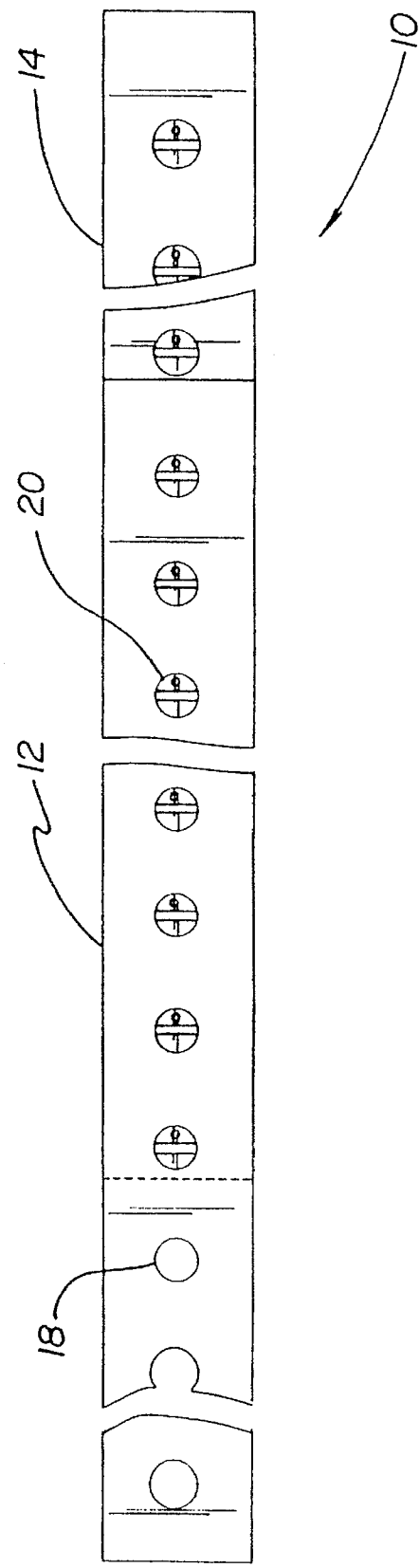
FIG. 3 is a bottom plan view of the invention.

A novel feature of the headliner retainer 10 comprising the present invention is a means for providing additional length-wise adjustment after the retainer has been snapped into position so as to be initially supporting a sagging headliner. As can be appreciated, the spacing of the apertures 18 results in limited length-wise adjustment choices between the two support members 12, 14. Depending on the spacing of the apertures 18, one choice of alignment between the apertures and projections 20 could result in retainer 10 being too long, while the next available alignment of apertures and projections could result in the retainer being too short. Accordingly, by utilizing the slightly shorter adjustment length, and then loosely snap-fitting the headliner retainer 10 in position, a more finite and precise fit can be achieved through the rotational movement of each of the individual projections 20. With particular reference to FIGS. 3 and 6, it can be seen that each projection 20 is movably attached to the flexible support member 14 by means of a metallic shaft 22. The metallic shaft 22 extends through the second support member 14 and includes a integral or otherwise fixedly secured cap member 24 to prevent its dislodgement therefrom. An opposed end 26 of the shaft is similarly flared or capped, and a body portion 28 of the projection 20 may be formed as a solid cylindrical portion of rigid plastic or the like, with it being rotatably mounted on the shaft 22.

An end portion 30 of the body section 28 is provided with a screwdriver-receiving slot 32, with this slot passing through the center axis of the body. By the same token, the body portion 28, as best illustrated in FIG. 6, is eccentrically mounted on the metallic shaft 22 while being rotatable thereabout.

In use, the two members 12, 14 are initially snap-fitted together by directing a plurality of the outwardly extending projections 20 into the equally spaced and aligned apertures 18. Presuming that the overall length of the headliner retainer 10 is slightly too short, it can still be snap-fitted or otherwise attached against an interior roof surface of a vehicle's passenger compartment so as to initially compress a sagging headliner back into its desired location. As can be understood, road vibration and other vehicle movement will cause a headliner retainer 10 which is too short to flex and move so as to eventually become loose and allow the headliner to again sag. As such, finite length-wise adjustment and tightening of the headliner retainer 10 is achieved by inserting a screwdriver into the slot 32 of each individual outwardly extending projection 20 which has been directed through a specific aperture 18. Through a plurality of clockwise or counter-clockwise rotational movements of the body portions 28 of each projection 20, relative movement between the members 12, 14 is achieved so as to effectively tighten and more securely attach the headliner retainer 10 against the passenger compartment roof. This is due to the fact that the eccentric mounting of each projection 20 on a metallic shaft 22 results in relative displacement between the members 12, 14 during a rotational movement of the body portion 28 of each projection.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letter Patent of the United States is as follows:

1. A new vehicle headliner support structure for securing a sagging headliner in a vehicle cab to an interior roof surface of said vehicle cab, said headliner support structure comprising:

first support means selectively engageable with one edge of said interior roof surface;

second support means selectively engageable with an opposed edge of said interior roof surface; and connection means for facilitating a connection between said first support means and said second support means, said second support means being adjustably connectable to said fist support means;

an adjustment means forming a part of said connection means and facilitating an adjustable fit of said first and second support means into secure engagement proximate said interior roof surface;

a number of through extending apertures provided on said first support means, a number of outwardly extending projections provided on said second support means, said outward extending projections being positionable within said apertures, thereby to effect a connection between said first and second support means so as to retain said headliner support structure proximate said interior roof surface of said vehicle cab;

said outwardly extending projections being rotatably attached to a planar surface of said second support means at an axis of rotation and included in said adjustment means;

said outwardly extending projections are each eccentrically positioned relative to its axis of rotation, whereby said outwardly extending projections effect a relative lateral movement of said second support means when said outwardly extending projections are rotated within said apertures, thereby to effect consequent relative movement between said first and second support means so as to provide a tightening effect of said headliner support structure proximate said interior roof surface.

2. The new vehicle headliner support structure for securing a sagging headliner in a vehicle cab to an interior roof surface of said vehicle cab, as described in claim 1, and further wherein said outwardly extending projections are provided with a slot for receiving a screwdriver, said screwdriver being utilized to effect an eccentric rotational movement of said outwardly extending projections relative to said apertures.

* * * * *